J. L. FATE, DEC'D.
D. L. FATE, EXECUTRIX.
METHOD OF AND APPARATUS FOR SEALING VACUUM JACKETS.
APPLICATION FILED OCT. 23, 1918.
1,423,093.
Patented July 18, 1922.
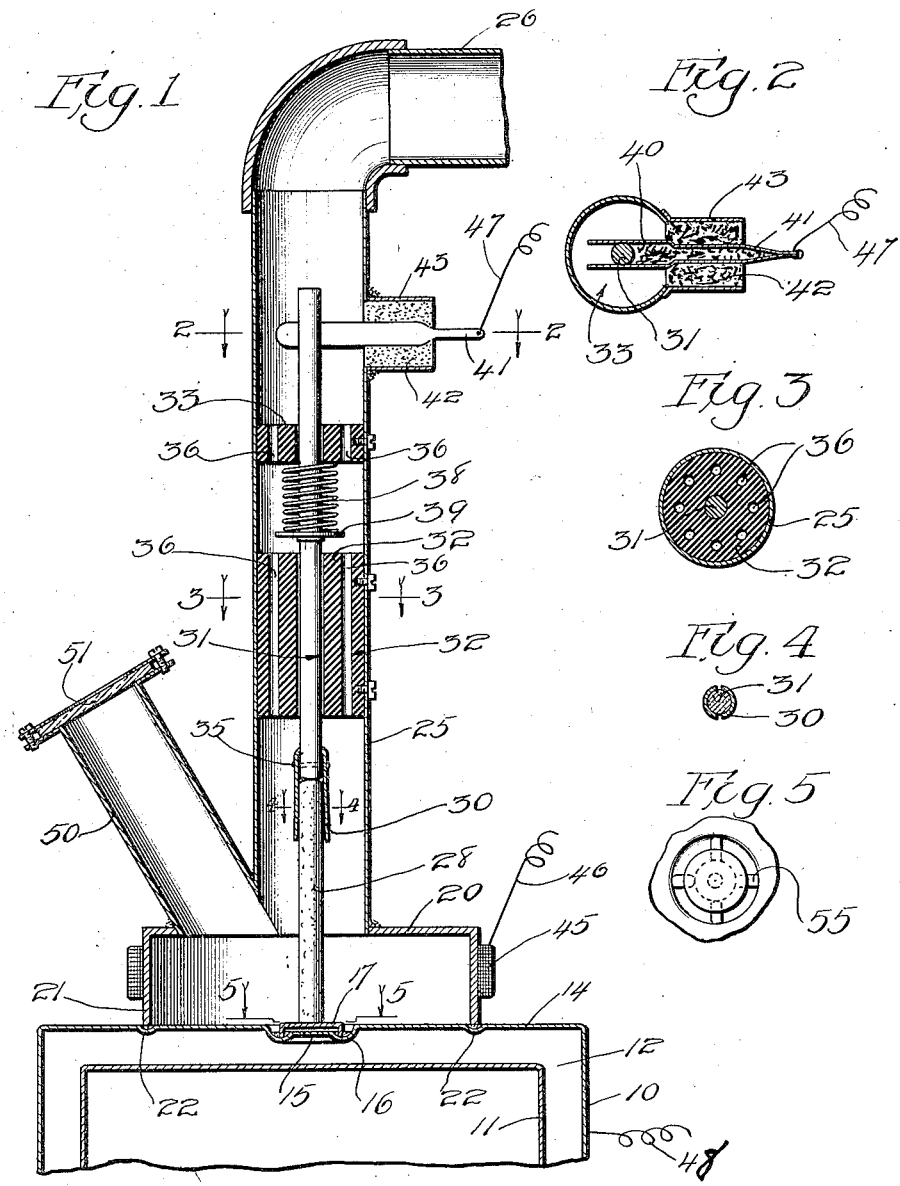

UNITED STATES PATENT OFFICE.

JOHN L. FATE, OF CHICAGO, ILLINOIS; DAISY L. FATE, EXECUTRIX OF SAID JOHN L. FATE, DECEASED, ASSIGNOR, BY MESNE ASSIGNMENTS, TO C. ROY GLEASON, OF CHICAGO, ILLINOIS.

METHOD OF AND APPARATUS FOR SEALING VACUUM JACKETS.

1,423,093.  Specification of Letters Patent.  Patented July 18, 1922.

Application filed October 23, 1918. Serial No. 259,390.

*To all whom it may concern:*

Be it known that I, JOHN L. FATE, a citizen of the United States, and a resident of Chicago, in the county of Cook and State of Illinois, have invented certain new and useful Improvements in Methods of and Apparatus for Sealing Vacuum Jackets; and I do hereby declare that the following is a full, clear, and exact description thereof, reference being had to the accompanying drawings, and to the characters of reference marked thereon, which form a part of this specification.

This invention relates to a novel method of and apparatus for sealing vacuum jackets from which air has been withdrawn to produce a high vacuum therein.

In vacuumizing jackets in accordance with my novel process and apparatus herein disclosed, a shell is connected by some suitable air tight joint with the outer face of one wall of the jacket surrounding an opening that communicates with the space to be exhausted, and this shell is connected by a pipe or thoroughfare to the exhaust side of an exhaust pump. The shell may be joined at the edge of its open side to the outer face of one wall of the jacket by solder. The opening in the wall of the jacket through which air is exhausted from the space between the jacket walls is covered by a cap or member which is adapted to be joined to the jacket wall, as by solder, and said cap and the means for joining it to said wall are so disposed that air may pass around the cap and through particles of fusible material by which the cap is joined to the wall, this cap being located within the shell above described. The cap is joined or soldered to the wall of the jacket at a time after the shell has been soldered at its edges to said wall, and after the opening in the jacket wall has been closed by soldering the cap thereover, the shell is disconnected from the jacket wall so that the device, by means of which the method is practiced, may be freely removed from the jacket, with the cap permanently sealed to said wall around the opening to the vacuum space.

The said shell may be soldered, brazed, or otherwise secured to the jacket wall by electric welding means, and likewise the cap, which is adapted to cover the opening leading to the vacuum space, may be soldered or welded to the wall by electric welding means.

The method, therefore, involves the steps of exhausting air from the space in the jacket through a conduit which is loaded with or in which is located a fusible material through which the air can be drawn by the exhausting pump, which fusible material is, thereafter fused to seal the opening leading to the vacuum space, and maintaining a vacuum on both sides of the opening which is thus being sealed during the sealing operation.

A complete form of apparatus for practicing the method is shown in the drawings, and will now be described. It will be understood, however, that, in respect of the broader phases of the invention, said apparatus may vary in its structural details from the construction illustrated.

As shown in the drawings;

Figure 1 is a vertical axial section of a vacuum jacket and an exhausting and sealing mechanism embodying one phase of the invention.

Figures 2, 3, and 4 are transverse sections on the lines 2—2, 3—3, and 4—4, respectively, of Figure 1.

Figure 5 is a top plan view of one wall of the vacuum jacket and the sealing cap as seen from the line 5—5 of Figure 1.

As shown in the drawings, 10—11 designate the outer and inner walls, respectively, of a hollow body or jacket adapted to form a vacuum chamber 12. Said jacket will be made of any suitable form to adapt itself to a particular use. The end portion 14 of the wall 10 is shown as provided centrally with an opening 15 which communicates with the space 12. As herein shown and preferably, the wall is depressed at 16 around the opening 15 to form an annular shallow trap 16 for a purpose to be hereinafter described. 17 designates a cap, the rim of which fits within the shallow trap 16 around the opening 15 and is adapted to be welded or soldered to the wall 14 to close the opening 15. 20 designates a shell, herein indicated as a circular shell, and the annular rim 21 thereof fits at its bottom margin on the upper face of the wall 14 of the jacket. As herein shown, said wall 14 is formed with an annular depression 22 with which the rim 21 of the shell 20 registers. When this depression 22 is formed, a string of solder may be laid therein on which the edge of rim 21 fits, and by which solder said rim is connected to the wall 14 of the jacket. 25 designates a conduit which leads upwardly from the central portion of the shell 20 and is adapted to be connected by a pipe 26 to the exhaust side of an exhaust pump not herein shown.

28 designates a carbon pencil which is disposed centrally of the conduit 25 and is adapted to rest at its lower end on the sealing cap 17. Said carbon pencil is removably connected, as by means of a resilient clamp 30, to a conducting rod 31 that extends upwardly through two centrally apertured guide members 32—33 within the conduit 25, and made of insulating material. The resilient clamp 30 is fixed to the lower end of said rod by means of a pin 35. The insulating apertured guide members 32, 33 are provided with a plurality of openings 36, radially exterior to the central guide openings and through which air may pass.

The said carbon pencil 28 is adapted, when the device is disconnected from a vacuum jacket, to be projected from the lower edge of the rim 21 of the shell 20, as by means of a spiral expansion spring 38, that is interposed between the upper insulating guide member 33 and a collar or disc 39 fixed to the carbon carrying rod.

The upper end of said rod 31 engages with the two arms of a clip 40, the outer end 41 of which extends through an insulating body 42 that is contained within a lateral arm 43 of the conduit 25, just below the elbow that connects said conduit to the exhaust pump pipe 26.

When the rim 21 of the shell 20 is to be joined to the wall 14 of the jacket by electrical welding or soldering means, said rim is surrounded by a coil 45 that is connected to a line conductor 46. When the cap 17 is to be joined to said wall 14 by electrical welding means, the clip 41 is in circuit, through a wire 47, with a source of electrical energy, not herein shown. 48 designates a grounded wire connected to the outer wall 10 of the jacket.

50 designates an observing tube that is connected with and extends through the top wall of the shell 20 and is provided with an upper transparent inlook wall 51 preferably made of glass. Said observing tube 50 is so located as to enable a person looking through the transparent end wall 51 to observe the soldering or welding condition of the cap 17.

In the operation of the device, a plurality of fusible particles 55, such as solder, are laid across the shallow trap groove 16 of the top 14 of the wall 10, and if the groove 22 be employed the solder is laid therein. Thereafter the device comprising the conduit or thoroughfare 25 and shell 20 and the carbon pencil 28 is applied to said end wall, with the rim 21 of the shell 20 registering with the annular groove 22 of the end wall 14 and with the carbon pencil 28 in register with the cap 17 that has theretofore been placed on the end wall 14. As above stated, before the device is applied to the vacuum jacket, said carbon pencil 28 is projected slightly beyond the rim 21 of the shell 20, the disc or collar 39, setting against the guide 32, limiting the projection of said carbon pencil from the shell.

After the sealing device has thus been applied to the end 14 of the vacuum jacket wall, the rim 21 of the shell 20 is soldered to said end wall 14, as by means of heat induced by a current passed through the coil 45 by way of the supply line 46 and grounded wire 47. After the shell has thus been soldered to the end 14, or otherwise connected thereto, to produce an air tight joint, air is exhausted from the space 12 by the air pump connected to the pipe 26. Air is permitted to flow from the space 12 through the opening 15 and past the solder particles 55 and around the cap 17 into the shell 20 and thence through the conduit or thoroughfare 25 to the pump, the air passing through the openings 36 of the insulating guide elements 32—33 of said thoroughfare. After the space 12 has thus been exhausted, the soldering or welding current is closed through the line 47, the clip 41, the rod 31, and the carbon pencil 38 to the cap 17 to thereby solder or otherwise connect the cap 17 to the end 14 of the shell 10 around the opening 15 and thus seal said opening 15 to avoid the leakage of air to the vacuum space 12.

After the cap 17 has thus been sealed to the end 14 of the wall, the joint between the rim 21 of shell 20 and the end wall 14 is broken. If this rim be electrically heated to solder or weld it to the end wall 14 current is closed through the coil 45 after the welding current has been turned off sufficiently to release the joint between the rim 21 and the end 14 of the wall 10, which finishes the job. It will be noted that when the rim 21 of shell 20 is in contact with the end 14 of shell 10, the spring 38 serves to press the carbon pencil 28 against the cap 17 so as to hold the rim of the cap firmly against the solder particles while the air is being exhausted from the space 12, and also after the current is closed through the rod 31 and cap 17 to weld or solder the latter to the end 14 of the wall 10, so as to insure a reliable joint between the cap 17 and wall 14.

It will thus be seen that the air tight joint between the shell 20 and end wall 14 prevents leakage of air into said shell so as to maintain a vacuum on both sides of the cap 17 and solder 55 during the sealing operation. It will also be observed that the shell 20 is a portion of the conduit leading from the vacuum space 12 to the exhaust side of the pump, and that the cap 17 and fusible particles 55 are located within said conduit thus formed so as to provide means whereby air may be freely exhausted from the space 12 until the proper vacuum is attained, whereupon the cap 17 may be welded to the end 17 of wall 10.

The employment of a coil 45 to seal the rim 21 of shell 20 to the end 14 of wall 10 is a convenient and desirable one, although this sealing may be otherwise effected,—as, for instance, by atmospheric pressure, acting when the space within the shell is exhausted, to press the shell rim against a suitable surface on the end wall 14.

I claim:

1. The method of exhausting and sealing a jacket having an opening through which air is exhausted and surrounded by a depression forming a trap, which embraces the steps of applying a fusible medium in said trap, applying a sealing cap over said opening in contact with said fusible medium, evacuating the jacket and forming a vacuumized space within a conduit around said opening, thereafter applying heat to said fusible medium through said cap while in the air exhausted space, whereby the sealing medium is trapped and the cap is sealed to the jacket over the opening, and finally releasing the vacuum in said vacuumized space.

2. The method of exhausting and sealing a jacket having an opening through which air is exhausted, which embraces the steps of applying over said opening a sealing element, interposing a fusible medium between said element and the jacket wall around said opening and through which fusible medium the air from the jacket is exhausted, exhausting the jacket and simultaneously forming a vacuumized enclosure within an exhaust tube around said opening, fusing said medium within the air exhausted enclosure, preventing the flow of the fused medium into said opening and finally releasing the vacuum in said enclosure.

3. Means for sealing a hollow jacket from which air has been exhausted comprising a shell open at one side for contact with the wall of the jacket around an opening therein through which air is exhausted from the jacket, and in communication with a conduit leading to an exhaust pump, means to solder the rim of the shell to a wall of said jacket, and electrical sealing means within the shell to close said opening.

4. Means for sealing the trapped opening of a jacket through which air is withdrawn, comprising a shell whose rim is adapted to be detachably connected to the jacket wall around said opening by means forming an air tight joint, a conduit leading from said shell and adapted for connection to an exhaust pump, an electrical resistance element within the shell adapted for central contact with a closing cap within the shell to close said opening and itself marginally supported by fusible material supported across the trap when solid, and adapted when fused to fill said trap, and means to close a circuit through said resistance element and the jacket wall.

5. Means for sealing the opening of a jacket from which air has been withdrawn, comprising a shell whose rim is adapted to be detachably connected to the jacket wall around said opening, a conduit leading from said shell, adapted for connection to an exhaust pump, a carbon pencil within the shell adapted for contact with a closing cap within the shell to close said opening, a conductor rod extending through said conduit and having electrical connections to an exterior circuit, a conductor connected to one wall of the jacket as a ground, and a resistance coil surrounding the rim of said shell in series with said ground for heating the rim to solder the latter to the jacket wall.

6. In combination with a shell open at one side and having a rim adapted to engage a jacket wall, a conduit in communication with the shell adapted for connection to an exhaust pump, a conductor rod within the conduit having means for connection to an external circuit, a clip fixed to one end of said rod, a carbon pencil detachably fixed to said clip, and a spring acting to normally project the carbon pencil beyond the edge of the rim of the shell while permitting it to retreat within the shell when the device is applied to an apertured jacket wall, with the resistance element in contact with a cap to close the opening in said wall.

7. In combination with a shell open at one side and having a rim adapted to engage a jacket wall, a conduit in communication with the shell adapted for connection to an exhaust pump, a conductor rod within the conduit, having means for connection to an external circuit, a clip fixed to one end of said rod, a resistance element detachably fixed to said clip, a spring acting to normally project the resistance element beyond the edge of the shell rim while permitting it to retreat into the shell when the device is applied to an apertured jacket wall, with the resistance element in contact with a cap to close an opening in said wall, and an observing tube connected to said shell.

8. In combination with a shell open at one side and having a rim adapted to engage an apertured jacket wall, a conduit in communication with the shell and adapted for connection to an exhaust pump, a conductor rod within the conduit having means for connection to an external circuit, a clip fixed to one end of said rod, a resistance element detachably fixed to said clip, a spring acting to normally project the resistance element beyond the edge of the rim of the shell, while permitting it to retreat into the shell when the device is applied to an apertured jacket wall, with the resistance element in contact with a cap to close the opening in said wall, and guides in said conduit made of insulating material and provided with air passages.

9. Means for exhausting and sealing a jacket having an exhaust opening and around said opening a trapped depression, comprising a rimmed cap over said opening adapted to be primarily supported at its margin by solid fusible particles within said depression, an exhaust tube adapted for connection with a vacuum pump and having an open end adapted for sealing connection with the jacket wall around said exhaust opening, and heating means within said tube adapted for central contact with said cap to fuse said particles and thereby to seal said cap to the jacket wall at said trapped depression.

10. Means for exhausting and sealing a jacket having an exhaust opening and around said opening a trapped depression, comprising a rimmed cap over said opening adapted to be primarily supported at its margin by solid fusible particles within said depression, an exhaust tube adapted for connection with a vacuum pump and having an open end adapted for sealing connection with the jacket wall around said exhaust opening, and an endwise spring pressed electrical heating element within said tube adapted for connection to an electric circuit and for pressure contact centrally against said cap.

In testimony whereof I claim the foregoing as my invention, I hereunto append my signature at Chicago, Illinois, this 19th day of October, 1918.

JOHN L. FATE.